United States Patent [19]

Sommers et al.

[11] Patent Number: 4,501,127
[45] Date of Patent: Feb. 26, 1985

[54] HEATING SYSTEM INCORPORATING AN ABSORPTION-TYPE HEAT PUMP AND METHODS FOR THE OPERATION THEREOF

[75] Inventors: Hans Sommers, Essen; Theo Jannemann, Dorsten, both of Fed. Rep. of Germany

[73] Assignee: Ruhrgas Aktiengesellschaft, Essen, Fed. Rep. of Germany

[21] Appl. No.: 316,355

[22] Filed: Oct. 29, 1981

[30] Foreign Application Priority Data

Oct. 29, 1980 [DE] Fed. Rep. of Germany ....... 3040628
Apr. 3, 1981 [DE] Fed. Rep. of Germany ....... 3113417

[51] Int. Cl.³ .................. F25B 27/02; F25B 15/00
[52] U.S. Cl. .................... 62/238.3; 62/476; 62/485; 431/328
[58] Field of Search ............. 237/2 B; 62/485, 238.3, 62/476; 165/62; 431/328

[56] References Cited

U.S. PATENT DOCUMENTS

| | | | |
|---|---|---|---|
| 2,272,871 | 2/1942 | McGrath . | |
| 2,369,235 | 2/1945 | Jaros | 158/104 |
| 3,367,310 | 2/1968 | Whitlow | 122/367 |
| 3,418,979 | 12/1968 | Reichmann | 431/328 |
| 4,312,476 | 1/1982 | Pohlmann | 62/324.2 Y |

FOREIGN PATENT DOCUMENTS

| | | | |
|---|---|---|---|
| 2756910 | 10/1969 | Fed. Rep. of Germany | 62/476 |
| 2528736 | 1/1977 | Fed. Rep. of Germany | 62/476 |
| 2841110 | 3/1980 | Fed. Rep. of Germany | 62/476 |
| 2838715 | 3/1980 | Fed. Rep. of Germany | 62/476 |
| 2015605 | 4/1970 | France | 62/476 |
| 1588610 | 4/1970 | France | 62/476 |
| 2076505 | 10/1971 | France | 62/238.3 |

Primary Examiner—Henry Bennett
Attorney, Agent, or Firm—Beall Law Offices

[57] ABSTRACT

The invention concerns a heating system incorporating an absorption-type heat pump where the generator is heated by an aerated gas burner combusting a fuel-lean mixture whose efficiency is very high both at full and at part load and whose flue gas has a very low nitrogen monoxide and nitrogen dioxide content.

The mixture of fuel gas and combustion air flows from at least one mixer tube 2 into a mixer 3 and is fired on the burner plate 4 cooled by a rich solution which is arranged at a distance of less than 50 mm from the generator 17.

When the generator is of the vertical type, a burner is preferably installed where the burner plate surrounds the generator concentrically at such a distance from the bottom of the generator that only the central section of the generator is directly heated.

Preferably two heat exchangers are located in the flue duct downstream of the generator to recover the waste heat, including the heat of condensation. The invention calls for the installation of a second burner 19 upstream of the first heat exchanger 9 which will light up and replace the burner for heating the generator, if the temperature falls below a preset lower temperature limit so that the heating system will meet demand even at very low outdoor temperatures.

43 Claims, 3 Drawing Figures

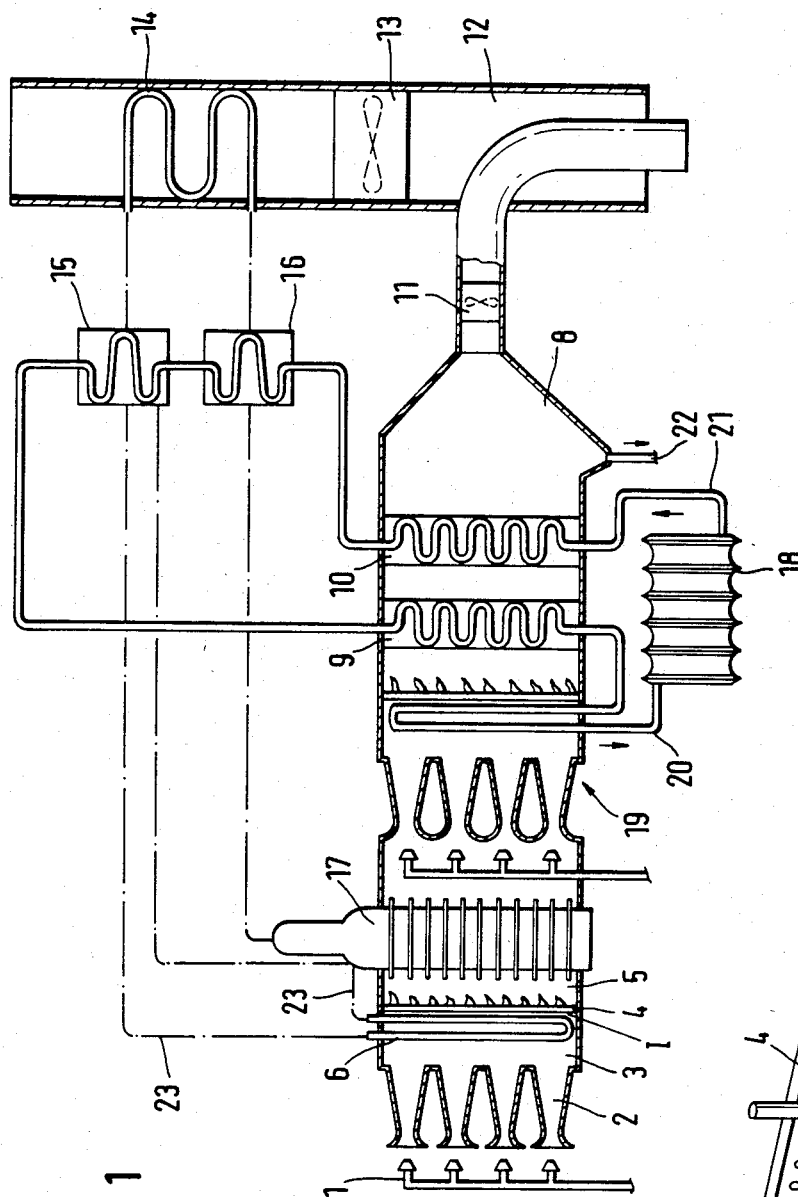
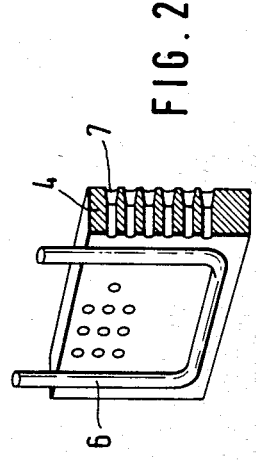
FIG. 1
FIG. 2

HEATING SYSTEM INCORPORATING AN ABSORPTION-TYPE HEAT PUMP AND METHODS FOR THE OPERATION THEREOF

The invention concerns a heating system incorporating a gas-fuelled absorption-type heat pump where the generator is incorporated in the flue gas ducting of the gas burner and where the solution or refrigerant loop is coupled with the heating water loop by means of heat exchangers and a method for the operation of said heating system.

Conventional gas-fuelled absorption-type heat pump heating systems, the coefficient of performance of absorption-type heat pumps being always lower than the coefficient of performance of compression-type heat pumps, do not fully recover the heat contained in the fuel gas:

Conventional generators are equipped with conventional burners such as aerated burners combusting a fuel-rich mixture where the efficiency and in particular the part load efficiency is not very high. The low efficiency is due to an uncontrolled flow of secondary air into the mixer causing a considerable increase in the air-gas ratio especially during part load operation so that the quantity of combustion air may be 2 to 3 times in excess of the quantity of air needed for combustion resulting in a decrease in the flame and flue gas temperature and an inefficient recovery of heat from the fuel gas.

The high air excess also causes the dewpoint of the flue gas to be low making the recovery of heat from the flue gas and in particular the recovery of the heat of condensation of the steam contained in the flue gas impossible on a useful temperature level.

This is why the principle of the efficient recovery of heat from the flue gas which has been known for many years has not yet been applied.

The flue gas produced by conventional burners also contains a comparatively high percentage of pollutants such as nitrogen monoxide and nitrogen dioxide.

Conventional generators are heated by burners arranged below the bottom of the generator or parallel to the axis of the generator regardless of whether the generator is of the vertical or the horizontal type.

If the system comprises a vertical generator the working fluid rich in refrigerant (refer to as the "rich solution") is introduced into the generator through the top and flows down to the bottom. The generator heating system evaporates refrigerant from the rich solution in the central section of the generator and said steam rises through the generator in counter-current flow to the rich solution. The working fluid poor in refrigerant (refer to as the "poor solution") leaves the generator at the bottom and enters a pipe to the absorber. To optimize the process the heat required for the evaporation of the refrigerant is preferably transferred in the central section of the generator where refrigerant evaporation is to be completed before the poor solution leaves the generator.

It is undesirable to heat the bottom of the generator because turbulence is created in the poor solution before it enters the pipe to the absorber. The bottom section of the generator which mainly contains poor solution should therefore not be heated directly. Further, the arrangement of the burner below the generator increases the overall height of the generator unit.

It is also well-known that the output of an absorption-type heat pump heating system decreases as the temperature of the heat source tapped for exchanging heat with the evaporator such as, in particular, outside air drops so that the heat pump ceases to be viable in financial terms when the temperature decreases below a threshold temperature such as an air temperature of $-5°$ C. Most suppliers of heat pump systems therefore propose to use an additional conventional boiler for space heating below the threshold temperature. Absorption-type heat pump heating systems incorporating additional components and circuitry in the heat pump cycle to allow space heating by mere heat exchange without absorption process are known to exist, but the design and installation of such heating systems is extremely elaborate and expensive.

It is the object of this invention to provide a heating system, as described hereinabove, incorporating a gas-fuelled absorption-type heat pump allowing a more efficient use of the heat energy contained in the fuel gas by the efficient generation of the heat needed for driving the absorption-type heat pump and to optimize the heat pump cycle so that the water will be heated both under full load and under part load conditions by less fuel gas than would be required for a conventional system.

It is further an object of this invention to provide a heating system with a wide control range which may be integrated into existing water systems and existing heat pump working fluid systems without any complex or elaborate modifications and which will cover the heat demand even if the outdoor temperature is low making the installation of an additional boiler for low outdoor temperature conditions unnecessary.

The characteristics and features described in claims 1 through 12 of this application achieve the objects of this invention described hereinabove.

According to one aspect of this invention an aerated gas burner combusting a fuel-lean mixture is employed for heating the generator of the absorption-type heat pump, said burner consisting of one or several orifices for discharging gas into one or several parallel mixer tubes, a downstream mixer, a burner plate of high thermal conductance and a sealed combustion chamber, the arrangement being such that the distance between the downstream generator incorporated in the flue gas ducting and the burner plate is less than 50 mm and preferably less than 30 mm. The burner plate has a number of ports distributed across the entire burner plate with not less than 4 ports for each square centimeter and a cooling coil integrated into the rich solution stream between the absorber and the generator.

This specification does not describe the mode of operation and the functions of the absorption-type heat pump as absorption-type heat pumps are well-known and are not the object of this invention.

The short distance between the burner plate and the generator referred to in claim 1 and the resulting even flame front across the entire burner plate cause the heat transfer to the generator to be extremely good and minimize radiation losses and in particular radiation losses across the combustion chamber walls which would have been high if the generator had been heated by a conventional system.

The rich solution from the absorber flows through the burner plate cooling coil and heat is transferred to said rich solution before it enters the generator so that the heat from the burner plate is also recovered for driving the absorption-type heat pump and the heat gain of the heat pump process therefore increases by the heat transferred from the burner plate multiplied by the coefficient of performance of the heat pump system.

As the combustion chamber is a sealed system allowing the entry of fuel gas, the departure of the products of combustion and the entry of air at a rate defined by the design of the burner system, there is no uncontrolled air ingress into the combustion chamber reducing the efficiency of the burner. The combustion air may be drawn from the room in which the heating system is installed or the air duct if the evaporator of the heat pump is incorporated in such an air duct. The combustion air flow through the mixer tubes may either be controlled or may be kept constant as a function of the heat input into the burner by a device such as the device arranged in the air duct and described in the unpublished West German patent application No. P 30 18 752.1. The means described hereinabove cause the burner to operate at a high efficiency under all load conditions and in particular under part load conditions. Further, the range in which the burner may operate is very large and the heat input into the burner may, for example, be reduced to approx. 40% of the rated heat input without any decrease in efficiency.

The means described hereinabove optimize the use made of the heat contained in the fuel gas and minimize the quantity of fuel gas required for a given heat output of the heating system.

Further, the short distance between the burner and the generator reduces the size of the generator unit and the fuel-lean combustion process minimizes the percentage of pollutants such as nitrogen monoxide and nitrogen dioxide contained in the flue gas.

An annular burner with a burner plate surrounding the generator at such a distance from the generator bottom that it will heat directly only the generator section containing the rich solution in the status of desorption equilibrium being a function of the pressure and the temperature of the desorption process, is preferably used for heating a generator of vertical design. The arrangement described optimizes the evaporation of the refrigerant without unnecessary heating the poor solution at the bottom of the generator and without causing undesirable turbulence in said poor solution.

Although most of the heat contained in the flue gas from the burner is transferred to the generator the flue gas still contains heat which is preferably recovered by two heat exchangers incorporated in the flue gas ducting to further increase the heat output. In the first one of said two heat exchangers, the temperature of the flow water from the heat pump heat exchangers is increased by the input of sensible heat from the flue gas. In the second one of said two heat exchangers through which return water passes, the steam contained in the flue gas is largely condensed due to the transfer of heat to the return water as the dew point of the flue gas is comparatively high because of the small quantity of excess air contained in said flue gas.

The liquid produced at said second heat exchanger is removed through a liquids tap.

The flue gas is vented to atmosphere by a flue gas fan as the buoyancy of the flue gas is insufficient for natural drafting due to the considerable cooling effect of the design described herein.

According to another aspect of the invention, no additional conventional boiler is needed if a second burner is incorporated upstream of the first heat exchanger. Said second burner is lit up as a function of the outdoor temperature while the burner upstream of the generator is shut off simultaneously, said second burner supplying the entire heat needed for heating the return water of the heating system. The first heat exchanger is sized for the transfer of approx. 90% of the heat outputted by the second burner.

The invention is now described in a non-limitative way with reference to the accompanying drawings, in which:

FIG. 1 shows a heating system with all relevant components,

FIG. 2 shows an exploded view of detail I in FIG. 1 and

The same reference number is used in all figures to designate the same components.

Figure 3:
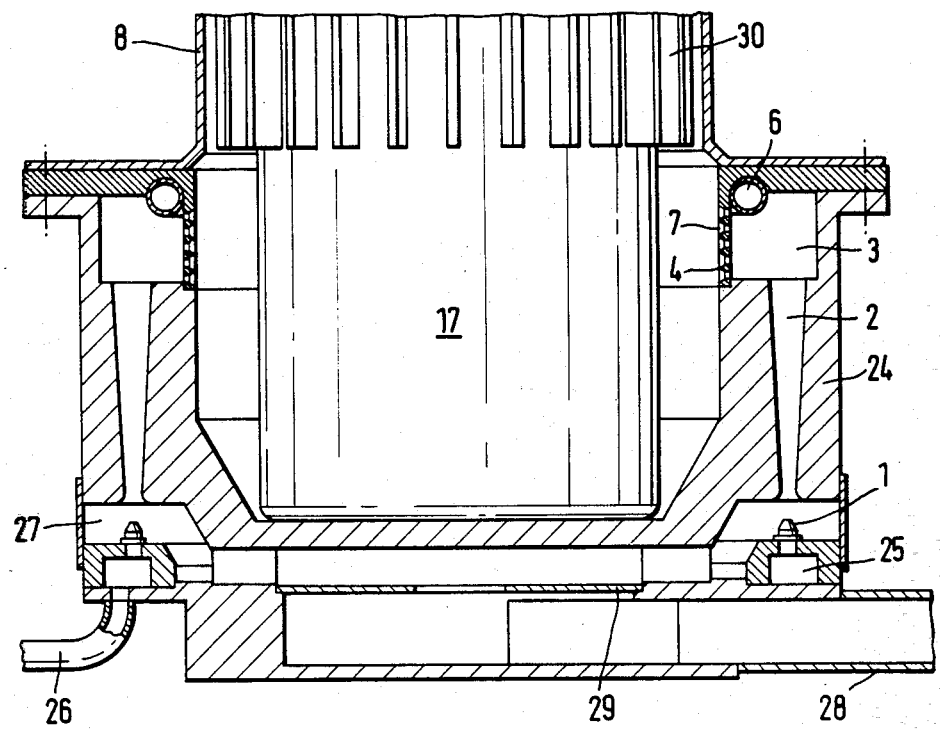
FIG. 3 shows a cross-section of a preferable system for heating a vertical generator (not shown as a cross-section) in accordance with claim 2.

The source of heat of the absorption-type heat pump is ambient air pumped to the evaporator 14 by an air fan 13 through air duct 12.

An aerated burner combusting a fuel-lean mixture of gas and air is used for heating the generator 17 and driving the absorption-type heat pump. In the example shown by FIGS. 1 and 2, said burner consists of several orifices 1 discharging gas into parallel mixer tubes 2 opening into one mixer 3, a parallel burner plate 4 arranged in parallel to the generator axis and a sealed combustion chamber 5.

The jets of gas discharged through the orifices 1 and all the combustion air drawn from the room in which the heat pump is installed flow into the mixer tubes 2.

The well-mixed fuel gas-combustion air mixture flows from the mixer 3 through the ports 7 of the burner plate 4 and is combusted in the combustion chamber 5, the flames being very short and forming a mat of flames because numerous ports 7 are distributed evenly across the entire burner plate. In the example presented by the figures some 1,300 ports of a diameter of approx. 2 mm at the inlet end widening by approx. 50% in a mode which may be conical to the outlet end are arranged on an area of approx. 200 $cm^2$ for a burner rated 15 kW.

Due to the extremely high unit heat input of approx. 0.75 W/$mm^2$ and the extremely short flames, the burner plate 4 heats up considerably and must therefore be cooled. As FIG. 2 shows, a cooling coil 6 is brazed to the burner plate 4 at the edge on the mixer end, said cooling coil being incorporated in the rich solution section 23 said cooling coil being passed by the rich solution from the absorber 15 and the solution pump not shown by the figure. Said rich solution section 23 and all other solution and refrigerant flows are represented by dash-dotted lines. The cooling coil 6 consists of a material which is resistant to the fluid passing through it. At the burner plate 4 heat is transferred to the rich solution which flows from the burner plate 4 to the generator 17.

It would also be feasible to cool the burner plate 4 by the water of the heating system but if such a cooling system was used the heat transferred would merely be added to the heat content of the water.

Due to the extremely short flames the distance between the generator 17 and the burner plate 4 may be minimized and may be reduced to approx. 30 mm so that the combustion chamber and radiation losses from the combustion chamber are extremely small.

Most of the heat contained in the flue gases from the burner is transferred to the generator 17 shown with symbolized heat exchanger fins while said flue gases pass round said generator. The heat transfer described reduces the temperature of the flue gases to approx. 170° C.

Two heat exchangers 9 and 10 are incorporated in the flue gas duct 8 at short intervals. Preferably the first heat exchanger 9 is incorporated in the flow water system 20, said flow water flowing from the heat pump heat exchangers 15 and 16 through the flue gas heat exchanger 9 and the cooling coil of the second burner 19 described below to the point of use 18.

If the difference in temperature between the flow water and the return water is approx. 10 K. the increase in temperature in the cooling coil of the second burner 19 and in the first heat exchanger 9 totals approx. 1 K. with the flue gas being cooled from approx. 170° C. to approx. 70° C.

In the second heat exchanger 10, the flue gas is cooled further and most of the steam contained in the flue gas condenses. The heat exchanger described is only feasible for the return water temperature level said return water flowing from the point of use 18 through the second heat exchanger 10 where its temperature is also increased by approx. 1 K. to the heat pump heat exchangers 16 and 15.

The heat exchangers used in the system invented are finned heat exchangers which are arranged in the flue gas ducting 8 so that the fins are vertical to allow the liquid to drain and to be removed through the liquids tap 22.

The flue gas fan 11 downstream of the two heat exchangers described hereinabove moves the flue gas through the flue gas duct 8 opening into the air duct 12 downstream of the evaporator 14 and the air fan 13. In the example shown by the drawing accompanying this application, the flue gas duct 8 continues inside the air duct beyond the end of said air duct, the low pollutant flue gases being diluted sufficiently by the large air flow leaving the air duct so that a connection of the flue duct to the flue stack is unnecessary allowing a very wide range of possibilities for the installation of the absorption-type heat pump using air as a source of heat described herein. The draft created by the flue gas fan adds to the effect of the gas issuing from the orifice entraining combustion air.

A second burner 19 is installed between the generator 17 and the first heat exchanger 9. In the example shown in the accompanying drawing, the axis of this burner is an extension of the axis of the first burner and the two burner plates are parallel to each other, but other arrangements of said two burners are feasible. The second burner 19 consists of the same components as the burner installed upstream of the generator. The second burner 19 may also be a conventional burner, if the flow of combustion air into said second burner is adequate. The entire air required for the operation of said second burner is moved by the fan through the mixer tubes 2 of the first burner into the flue gas ducting 8 of the heating system and into the area of the jets of the second burner. Preferably the flue gas duct 8 upstream of the second burner incorporates a restriction for the fine adjustment of the combustion air flow rate to the second burner. The plate of the second burner is cooled by the flow water 20 passing completely through the burner plate cooling coil after having been discharged from the heat exchanger 9 when the second burner is in operation.

When the heat pump is in operation, only part of the flow water passes through the burner plate cooling coil. Flows may, for example, be controlled by a standard car cooling water thermostat incorporated in the flow water system.

The second burner 19 is lit up if the outdoor temperature falls below the threshold temperature at which heat pump operation ceases to be viable in financial terms and the burner upstream of the generator 17 is switched off.

Both burners are ignited, controlled and supervised by an automatic control system not shown by the accompanying drawings. As the second burner 19 is designed to supply the entire heat needed by the heating system even on the coldest day through the heat exchangers 9 and 10 the rating of said second burner must be considerably larger (approximately twice as large) than the rating of the first burner. For this reason, the flow rate across the flue gas fan must be adjusted to the heat input of the burner in operation, but the speed of said fan need not be adjusted if the fan is arranged between the generator and the second burner as provided for by the invention. The difference in the rate of flow is an automatic effect of the difference in the density of the hot flue gas moved by the fan during heat pump operation and the density of cold combustion air moved by the fan during the conventional operation of the heating system.

The heat exchangers 9 and 10 are sized to optimized the recovery of heat from the flue gas of the first burner downstream of the generator 17 and the recovery of heat from the considerably hotter flue gas of the second burner when the heat pump is shut down. If the flue gas duct only incorporates one conventional heat exchanger instead of the two heat exchangers provided for by the invention, the burner can supply sufficient heat to said conventional heat exchanger which must be sized accordingly.

FIG. 3 shows another design of the generator heating system which is particularly effective.

The bottom part of the generator 17 is surrounded concentrically by the cup-shaped burner body 24 incorporating twelve conical mixing tubes 2 distributed evenly around the circumference of the burner body. Said mixer tubes may also be of cylindrical design which would create a considerable pressure drop in the gas/air mixture. The number of mixer tubes depends on the diameter of the generator but preferably the burner body should incorporate not less than six mixer tubes. An orifice 1 discharges the gas into each mixer tube and the orifices of all mixer tubes are fed by a joint circular duct 25 or a loop line connected to a gas line 26. The orifices 1 discharging the gas into the mixer tubes are located in a sealed air intake chamber 27 connected to an air duct not shown by the air line 28 so that the air required for combustion may be drawn from outside.

A restrictor 29 is incorporated in the air line 28 before the inlet of the air intake chamber 27 for adjusting the air volume rate of flow.

The combustion air entrained by the gas and the flue gas fan mixes with the fuel gas and flows through the mixer tubes 2 into the annular mixer 3 with a cylindrical burner plate 4 surrounding the generator 17 at a height which is approximately equal to the length of the mixer tubes, said burner plate 4 being flanged to the body 24. The axis of the ports 7 are vertical to the generator axis, said ports 7 being designed like those of the burner plate shown in FIG. 2 and described above. Said burner plate 4 is also cooled by a cooling coil 6 through which rich solution from the absorber is passed. The burner plate 4 may also be annular and incorporate ports running parallel to the generator axis.

To minimize the burner weight, the burner or most of the burner components are of aluminum which is suitably diecast to minimize production cost. The cooling coil 6 must be resistant to the rich solution and is made of steel pipe. Above the burner vertical heat exchanger fins 30 are located around the circumference of the generator in the section filled with liquid to transfer heat from the flue gas to the generator.

The contribution of the conventional heating system (second burner) to the overall heating load per year may be minimized by a suitable selection of the ratings of the first and second burners.

Due to the high efficiency of the burner used for heating the generator even under part load conditions the system may also feature one burner so that the entire heat needed throughout the year will be supplied by the absorption-type heat pump even at low outdoor temperatures with the first and only burner operating at full load at an extremely low outdoor temperature and at part load for most of the time.

What we claim is:

1. In a heating system with a fuel gas-fired absorption-type heat pump having a refrigerant solution loop of generator, condenser, evaporator and absorber, in which the generator is located in the flue duct of the gas burner and in which the refrigerant solution loop is coupled to the heating water loop by means of heat exchangers:
   the gas burner is an aerated gas burner combusting a fuel-lean mixture;
   said burner having at least one fuel delivery orifice, at least one parallel mixer tube receiving the fuel gas from the orifice and entraining combustion air;
   mixer means receiving the fuel gas and entrained air;
   a burner plate of high thermal conductance on which the fuel gas and air mixture is burned and a sealed combustion chamber receiving the burning mixture;
   said combustion chamber being connected downstream to said flue duct;
   said generator being arranged so that the distance between the burner plate and the generator is less than approximately 50 mm.;
   said burner plate having a plurality of mixture passing ports leading to said combustion chamber distributed across the entire burner plate, said ports being not less than 4 ports for each square centimeter; and
   a closed refrigerant piping system including piping means for passing rich refrigerant solution from said absorber to said generator, said piping means including means for cooling said burner plate by transfering heat from said burner plate to said rich solution before said generator, said cooling means being bonded to the surface of said burner plate opposite from said generator.

2. In a heating system with a fuel gas-fired absorption-type heat pump having a refrigerant solution loop of generator, condenser, evaporator and absorber, in which the generator is located in the flue duct of the gas burner and in which the refrigerant solution loop is coupled to the heating water loop by means of heat exchangers;
   the gas burner is an aerated gas burner combusting a fuel-lean mixture;
   said burner having at least one fuel delivery orifice, at least one parallel mixer tube receiving the fuel gas from the orifice and entraining combustion air;
   mixer means receiving the fuel gas and entrained air;
   a burner plate of high thermal conductance on which the fuel gas and air mixture is burned and a sealed combustion chamber receiving the burning mixture;
   said combustion chamber being connected downstream to said flue duct;
   said generator being arranged so that the distance between the burner plate and the generator is less than approximately 50 mm.;
   said burner plate having a plurality of mixture passing ports leading to said combustion chamber distributed across the entire burner plate, said ports being not less than 4 ports for each square centimeter;
   a refrigerant solution cooling coil integrated into the refrigerant solution loop for piping the rich solution between the absorber and the generator;
   said generator being arranged vertically;
   said burner including a cup-shaped burner body concentrically surrounding said generator; and said mixer means including at least six mixer tubes evenly circumferentially spaced around said burner body, generally parallel to each other and each respectively aligned with a fuel delivery orifice, an annular mixer chamber jointly communicating with the end of said mixer tubes opposite from said fuel delivery orifice and concentrically surrounding said generator, an arcuate fuel chamber generally concentric with said generator and jointly communicating with said fuel delivery orifices; and said burner plate being annular and concentrically surrounding the central, with respect to the vertical direction, section of the generator at a distance spaced from the bottom of said generator, that is approximately equal to the length of the mixing tubes.

3. In a heating system with a fuel gas-fired absorption-type heat pump having a refrigerant solution loop of generator, condenser, evaporator and absorber, in which the generator is located in the flue duct of the gas burner and in which the refrigerant solution loop is coupled to the heating water loop by means of heat exchangers;
   the gas burner is an aerated gas burner combusting a fuel-lean mixture;
   said burner having at least one fuel delivery orifice, at least one parallel mixer tube receiving the fuel gas from the orifice and entraining combustion air;
   mixer means receiving the fuel gas and entrained air;
   a burner plate of high thermal conductance on which the fuel gas and air mixture is burned and a sealed combustion chamber receiving the burning mixture;
   said combustion chamber being connected downstream to said flue duct;
   said generator being arranged so that the distance between the burner plate and the generator is less than approximately 50 mm.;
   said burner plate having a plurality of mixture passing ports leading to said combustion chamber distributed across the entire burner plate, said ports being not less than 4 ports for each square centimeter;

a refrigerant solution cooling coil integrated into the refrigerant solution loop for piping the rich solution between the absorber and the generator; and said burner including an annular burner body having a plurality of circumferentially spaced fuel delivery orifices and mixer tubes generally parallel to each other and extending vertically parallel to the axis of the burner, said burner plate being annular and surrounding only the mid-section of said generator at a distance spaced above the bottom of said generator.

4. A fuel gas-fired absorption-type heat pump heating system comprising:

a generator including a burner plate for producing refrigerant vapor from a strong refrigerant solution with the addition of heat;

a heat exchange condensor for condensing the refrigerant vapor to produce a refrigerant condensate and giving up the heat of condensation;

an evaporator heat exchanger for vaporizing the refrigerant condensate for the addition of the heat of vaporization;

an absorber for absorbing the refrigerant vapor from said evaporator with a weak refrigerant solution from said generator to provide a strong refrigerant solution and give off the heat of absorption;

a closed refrigerant piping system including piping means for passing refrigerant vapor from said generator to said condenser, passing refrigerant condensate from said condenser to said evaporator, passing refrigerator vapor from said evaporator to said absorber, passing strong refrigerant solution from said absorber to said generator, and passing weak refrigerant solution from said generator to said absorber said piping means including means for cooling said burner plate by transfering heat from said burner plate to said strong refrigerant solution passing from said absorber to said generator;

an air duct having therein said evaporator and for passing environmental air in heat exchange with said evaporator to add the heat of vaporization to said evaporator;

burner means for burning a mixture of fuel gas and air and providing the heat of vaporization to said generator;

flue gas duct means for receiving the products of combustion from said burner means downstream of said generator and passing the same into the air duct.

5. A fuel gas-fired absorption-type heat pump heating system comprising:

a generator for producing refrigerant vapor from a strong refrigerant solution with the addition of heat of vaporization;

a heat exchange condenser for condensing the refrigerant vapor to produce a refrigerant condensate and giving up the heat of condensation;

a heat exchange evaporator for vaporizing the refrigerant condensate with the addition of the heat of vaporization;

an absorber for absorbing the refrigerant vapor from said evaporator with a weak refrigerant solution from said generator to provide the strong refrigerant solution and give off the heat of absorption;

a closed refrigerant piping system including piping means for passing the refrigerant vapor from said generator to said condenser, passing the refrigerant condensate from said condenser to said evaporator, passing the refrigerant vapor from said evaporator to said absorber, passing the strong refrigerant solution from said absorber to said generator, and passing the weak refrigerant solution from said generator to said absorber;

an air duct having therein said evaporator and for passing environmental air in heat exchange with said evaporator to add the heat of vaporization to said evaporator;

burner means for burning a mixture of fuel gas and air, and providing the heat of vaporization to said generator;

flue gas duct means for receiving the products of combustion from said burner means downstream of said generator and passing the same to a disposal point;

a utilization heat exchange closed loop, comprising a first liquid-gas flue duct heat exchanger mounted within said flue gas duct means, a second liquid-gas flue duct heat exchanger mounted within said flue gas duct means downstream of said first flue duct heat exchanger, a utilization heat exchanger mounted in an area to be heated, a liquid-gas heat exchanger forming said evaporator, a liquid-gas heat exchanger forming said condenser, and piping means providing liquid communication serially in a closed loop in order between said utilization heat exchanger, said second heat exchanger, said condenser heat exchanger, said absorber heat exchanger, and said first heat exchanger; and second burner-means for burning a fuel gas-air mixture within said flue gas duct means downstream of said generator and first-mentioned burner means, and upstream of said first and second heat exchangers.

6. A fuel gas-fired absorption-type heat pump heating system comprising:

a generator for producing refrigerant vapor from a strong refrigerant solution with the addition of heat;

a heat exchange condensor for condensing the refrigerant vapor to produce a refrigerant condensate and giving up the heat of condensation;

an evaporator heat exchanger for vaporizing the refrigerant condensate for the addition of the heat of vaporization;

an absorber for absorbing the refrigerant vapor from said evaporator with a weak refrigerant solution from said generator to provide a strong refrigerant solution and give off the heat of absorption;

a closed refrigerant piping system including piping means for passing refrigerant vapor from said generator to said condenser, passing refrigerant condensate from said condenser to said evaporator, passing refrigerant vapor from said evaporator to said absorber, passing strong refrigerant solution from said absorber to said generator, and passing weak refrigerant solution from said generator to said absorber;

an air duct having therein said evaporator and for passing environmental air in heat exchange with said evaporator to add the heat of vaporization to said evaporator;

burner means for burning a mixture of fuel gas and air and providing the heat of vaporization to said generator;

flue gas duct means for receiving the products of combustion from said burner means downstream of said generator and passing the same to a disposal point;

said burner means having only a single air inlet providing all of the air passing through said flue gas duct means, and mixing all of said air with all of the fuel gas prior to burning so that there is no secondary air;

heat exchange means in said flue gas duct means downstream of said generator for reducing the temperature of said flue gas below the dew point of water vapor contained therein;

means for collecting, draining and removing condensate from said heat exchanger means;

second burner means for burning a fuel gas-air mixture within said flue gas duct means downstream of said generator and first-mentioned burner means, and upstream of said heat exchanger means;

control means responsive to the environmental air temperature of the air supplied to said air duct for operating only said first-mentioned burner means when said temperature is above a fixed temperature and operating only said second burner means when said temperature is below a fixed temperature; and a utilization heat exchanger fluid connected to said heat exchanger means.

7. A fuel gas-fired absorption-type heat pump heating system comprising:

a generator for producing refrigerant vapor from a strong refrigerant solution with the addition of heat;

a heat exchange condensor for condensing the refrigerant vapor to produce a refrigerant condensate and giving up the heat of condensation;

an evaporator heat exchanger for vaporizing the refrigerant condensate for the addition of the heat of vaporization;

an absorber for absorbing the refrigerant vapor from said evaporator with a weak refrigerant solution from said generator to provide a strong refrigerant solution and give off the heat of absorption;

a closed refrigerant piping system including piping means for passing refrigerant vapor from said generator to said condenser, passing refrigerant condensate from said condenser to said evaporator, passing refrigerant vapor from said evaporator to said absorber, passing strong refrigerant solution from said absorber to said generator, and passing weak refrigerant solution from said generator to said absorber;

an air duct having therein said evaporator and for passing environmental air in heat exchange with said evaporator to add the heat of vaporization to said evaporator;

burner means for burning a mixture of fuel gas and air and providing the heat of vaporization to said generator;

flue gas duct means for receiving the products of combustion from said burner means downstream of said generator and passing the same to a disposal point;

said generator being vertically arranged with a vapor outlet at its top and a weak solution outlet at its bottom; and said burner means including flame-holding plate means at least partially surrounding the central portion of said generator spaced upwardly from its bottom and spaced downwardly from its top.

8. A fuel gas-fired absorption-type heat pump heating system comprising:

a generator for producing refrigerant vapor from a strong refrigerant solution with the addition of heat;

a heat exchange condensor for condensing the refrigerant vapor to produce a refrigerant condensate and giving up the heat of condensation;

an evaporator heat exchanger for vaporizing the refrigerant condensate for the addition of the heat of vaporization;

an absorber for absorbing the refrigerant vapor from said evaporator with a weak refrigerant solution from said generator to provide a strong refrigerant solution and give off the heat of absorption;

a closed refrigerator piping system including piping means for passing refrigerant vapor from said generator to said condenser, passing refrigerant condensate from said condenser to said evaporator, passing refrigerant vapor from said evaporator to said absorber, passing strong refrigerant solution from said absorber to said generator, and passing weak refrigerant solution from said generator to said absorber;

an air duct having therein said evaporator and for passing environmental air in heat exchange with said evaporator to add the heat of vaporization to said evaporator;

burner means for burning a mixture of fuel gas and air and providing the heat of vaporization to said generator;

flue gas duct means for receiving the products of combustion from said burner means downstream of said generator and passing the same to a disposal point;

said burner means including a perforated plate closely adjacent said generator; and said piping system including means bonded to the surface of said plate opposite from said generator for cooling said burner plate by transfering heat from said burner plate to said strong refrigerant solution passing from said absorber to said generator.

9. A heating system according to claim 3, wherein said burner plate is spaced vertically above the bottom of said generator a distance substantially equal to the axial length of said mixer tubes.

10. A heating system according to claim 3, wherein said combustion chamber is annular and concentrically surrounds said burner plate.

11. A heating system according to any one of claims 1, 2, or 3, wherein said burner further includes an annular air intake chamber having said orifices leading into it and the inlet of said mixer tubes leading out of it, and an air supply line with an air volume adjusting restrictor opening into said air intake chamber.

12. A heating system according to any one of claims 1–3, wherein said burner is substantially entirely constructed of aluminum except for said cooling coil.

13. A heating system according to claim 12, wherein said aluminum is die-cast.

14. A heating system according to any one of claims 1–3, wherein said burner plate is cylindrical, and said ports are vertically and horizontally spaced from each other.

15. The heating system according to any one of claims 1-3, wherein the distance between said burner plates and the generator is less than 30 mm.

16. A heating system according to any one of claims 1∝3, wherein the ports of said burner plates have a diameter of approximately 1 mm. to 3 mm. and increase in diameter by approximately 50% from the inlet end to the outlet end.

17. A heating system according to any one of claims 1-3, further including two separate corrosion resistant gas-liquid heat exchangers and a flue gas fan mounted within said flue gas duct downstream of said generator for containing a heat exchange liquid; one of said heat exchangers being downstream of the other head exchanger; a utilization heat exchanger fluid connected serially with each of said flue duct heat exchangers; and including means for collecting and discharging flue gas condensate from at least said downstream flue duct heat exchanger.

18. A heating system according to claim 17, in which each of said flue duct heat exchangers has a plurality of external heat exchange fins extending vertically for freely draining condensate.

19. A heating system according to claim 17, further including a second fuel gas burner mounted within each flue gas duct upstream of said flue duct heat exchangers and downstream of said generator and first-mentioned burner; said second burner including a burner plate and a cooling coil adjacent said burner plate that is fluid connected serially with said utilization heat exchanger and said flue duct heat exchangers.

20. A heating system according to claim 19, further including a gas fan means mounted within said flue gas duct between said generator and said second burner.

21. A heating system according to claim 20, including means responsive to outside environment air temperature for operating said first-mentioned burner and disabling said second-mentioned burner at temperatures above a fixed temperature, and operating said second burner and disabling said first-mentioned burner at temperatures below said fixed temperature; and further including means for adjusting the flow rate of gases passing through said flue gas duct in accordance with the output of the operating burner.

22. A heating system according to claim 19, including means responsive to outside environment air temperature for operating said first-mentioned burner and disabling said second-mentioned burner at temperatures above a fixed temperature, and operating said second burner and disabling said first-mentioned burner at temperatures below said fixed temperature; and further including means for adjusting the flow rate of gases passing through said flue gas duct in accordance with the output of the operating burner.

23. The apparatus of claim 5, further including said second burner means having a burner plate providing combustion on one side of said plate adjacent said first heat exchanger; and said piping means including a heat exchanger immediately adjacent the side of said burner plate opposite from said first heat exchanger and liquid connected in circuit between said first heat exchanger and said utilization heat exchanger.

24. The apparatus of claim 23, further including a fan mounted within said flue gas duct means downstream of said generator and upstream of said second burner.

25. The apparatus of claim 24, further including said flue gas duct means having only one air inlet, said flue gas duct means air inlet being upstream of said generator and providing all of the air for both said first-mentioned burner means and second burner means.

26. The apparatus of claim 5, further including a fan mounted within said flue gas duct means downstream of said generator and upstream of said second burner.

27. The apparatus of claim 26, further including said flue gas duct means having only one air inlet, said flue gas duct means air inlet being upstream of said generator and providing all of the air for both said first-mentioned burner means and second burner means.

28. The apparatus of claim 27, wherein each of said burner means mixes all of the air from said air inlet with all of the fuel gas prior to burning so that there is no secondary air.

29. The apparatus of claim 8, further including means responsive to the temperature of the environmental air supplied to said air duct for operating only said first-mentioned burner means when said temperature is below a first, fixed temperature and operating only said second burner means when said temperature is above a fixed temperature.

30. The apparatus of claim 6, further including fan means mounted within said flue gas duct means downstream of said generator and upstream of said second burner for supplying all of the combustion air to said second burner means and receiving air only from said air inlet means.

31. The apparatus in accordance with any one of claims 6 and 30, wherein said flue gas duct means discharges the flue gas into the environmental air being discharged from said air duct.

32. The apparatus of claim 4, wherein the air duct has an outlet pipe and said flue gas duct means has an outlet pipe concentrically within the outlet pipe of said air duct means.

33. The apparatus of claim 32, wherein said flue gas duct means outlet pipe has a terminal end extending beyond the terminal end of said air duct a substantial distance.

34. The apparatus of claim 7, wherein said plate means is a perforated cylindrical plate spaced from said generator a distance less than approximately 50 mm., and said burner means further including an annular mixture chamber surrounding the outside of said plate, a plurality of vertically extending parallel mixing tubes spaced peripherally around said generator and discharging into said mixer chamber, and a plurality of fuel-gas orifices discharging a fuel-gas jet into the inlet end of said mixing tubes.

35. The apparatus of claim 34, wherein said mixing tubes are conical and increase in diameter from their inlet end to their discharge end.

36. The apparatus of any one of claims 34 and 35, wherein said burner means further includes an annular fuel gas supply duct upstream of said orifices, and an annular air intake chamber between said orifices and mixing tubes.

37. The apparatus of claim 34, wherein said plate is spaced above the bottom of said generator a distance substantially equal to the axial length of said mixing tubes, and said mixing tubes extend substantially the full length from the bottom of said generator to the bottom of said plate; and wherein there are at least six of said mixing tubes evenly spaced around the periphery of said burner means.

38. The apparatus of any one of claims 7, 34, 35, and 37, wherein said burner means includes a cylindrical wall above said plate, and further including a plurality of heat exchange, vertical, fins extending radially between said generator and burner wall above said plate.

39. The apparatus of claim 8, wherein said cooling means is serially located between said absorber and said generator for passing therethrough the strong solution.

40. The apparatus of any one of claims 8 and 39, wherein said burner means plate is spaced from said generator a distance less than 50 mm.

41. The apparatus of claim 39, wherein said burner means plate includes a plurality of ports forming the perforations, and each of said ports having a diameter within the range of approximately 1 mm. to 3 mm.

42. The apparatus of claim 41, wherein each of said ports increases conically in diameter approximately 50% towards said generator.

43. The apparatus of any one of claims 8 and 39, wherein said burner means mixes all of its air and fuel gas prior to passing the mixture through the perforations of said plate and prevents the addition of any secondary air.

* * * * *